(12) United States Patent
Xu et al.

(10) Patent No.: US 8,401,124 B2
(45) Date of Patent: Mar. 19, 2013

(54) METHOD, DEVICE AND SYSTEM FOR DETECTING PILOT SEQUENCE SIGNAL

(75) Inventors: Hongyan Xu, Beijing (CN); Kewei Wu, Beijing (CN); Yinxiang Zheng, Beijing (CN); Yuemin Cai, Beijing (CN)

(73) Assignee: China Academy of Telecommunications Technology, Haidian District, Beijing (CN)

( * ) Notice: Subject to any disclaimer, the term of this patent is extended or adjusted under 35 U.S.C. 154(b) by 522 days.

(21) Appl. No.: 12/602,394

(22) PCT Filed: May 27, 2008

(86) PCT No.: PCT/CN2008/001027
§ 371 (c)(1),
(2), (4) Date: Jan. 6, 2010

(87) PCT Pub. No.: WO2008/148295
PCT Pub. Date: Dec. 11, 2008

(65) Prior Publication Data
US 2010/0189165 A1      Jul. 29, 2010

(30) Foreign Application Priority Data

May 31, 2007   (CN) .......................... 2007 1 0099927

(51) Int. Cl.
*H03D 1/00* (2006.01)
*H04L 27/06* (2006.01)
(52) U.S. Cl. .......................... 375/340; 370/491; 370/500

(58) Field of Classification Search .................. 375/316, 375/340; 370/491, 500
See application file for complete search history.

(56) References Cited

U.S. PATENT DOCUMENTS

| | | | |
|---|---|---|---|
| 6,728,233 B1* | 4/2004 | Park et al. | 370/342 |
| 2005/0210364 A1* | 9/2005 | Kim | 714/781 |
| 2006/0087997 A1* | 4/2006 | Li | 370/320 |
| 2006/0142041 A1* | 6/2006 | Tomasin et al. | 455/522 |
| 2006/0285478 A1* | 12/2006 | Gaikwad et al. | 370/203 |
| 2008/0259892 A1* | 10/2008 | Li et al. | 370/342 |

* cited by examiner

*Primary Examiner* — Jean B Corrielus
(74) *Attorney, Agent, or Firm* — Sutherland Asbill & Brennan LLP

(57) ABSTRACT

A method for detecting pilot sequence signal includes: when the service data signal in the received signal is confirmed to be right, the said service data signal is extracted from the received signal, wherein, the service data signal and the pilot sequence signal in the received signal are located in the same slot; the pilot sequence signal is obtained from the received signal having been extracted the service data signal. At the same time, a communication device and a communication system are provided. The interference of pilot sequence signal made by the service data signal can be restrained, the detecting performance of the pilot sequence can be enhanced by using the present invention.

12 Claims, 4 Drawing Sheets

METHOD, DEVICE AND SYSTEM FOR DETECTING PILOT SEQUENCE SIGNAL

CROSS-REFERENCE TO RELATED APPLICATION

This is a submission pursuant to 35 U.S.C. 154(d)(4) to enter the national stage under 35 U.S.C. 371 for PCT/CN2008/001027 filed May 27, 2008. Priority is claimed under 35 U.S.C. 119(a) and 35 U.S.C. 365(b) to Chinese Patent Application Number 200710099927.5 filed May 31, 2007. The subject matter of PCT International Application Number PCT/CN2008/001027 and Chinese Patent Application Number 200710099927.5 are hereby expressly incorporated herein by reference in their entirety.

FIELD OF THE INVENTION

The present invention relates to the field of communication technologies and in particular to a method, device and system for detecting a pilot sequence signal.

BACKGROUND OF THE INVENTION

It is often desirable to perform operations such as synchronization and channel estimation by using a pilot sequence signal in a mobile communication system. In a TD-SCDMA system, for example, a downlink pilot time slot (DwPTS) signal can be used for downlink synchronization and an uplink pilot time slot (UpPTS) signal can be used for uplink synchronization. After receiving a signal containing a pilot sequence signal, a receiver can detect the pilot sequence signal in the received signal with a specific detection algorithm and perform an operation such as synchronization operation dependent upon the detection result.

However, in a practical application, a pilot sequence signal may be transmitted overlapping with a service data signal at a time, that is, the pilot sequence signal and the service data signal may be arranged in the same time slot, in view of spectrum utilization and the like. For a time division system with a special frame structure, for example, a pilot sequence signal may cause cross-interference in a time slot to a service data signal due to a propagation delay or other reasons, and at this time it might be highly possible to degrade greatly the performance of detecting the pilot sequence signal without taking any measure and thus influence seriously the quality of communication. For example, an UpPTS signal may fall into a time slot TS1 where a service data signal is arranged due to a propagation delay under the condition of wide coverage in a TD-SCDMA system. Moreover in a special scenario, for example, in order to avoid interference of a DwPTS signal from a remote base station with the reception of an UpPTS signal at the local base station, it may also be possible to displace the UpPTS signal directly into a time slot where a service data signal is arranged and transmit the overlapping signals, and at this time the UpPTS signal might be interfered seriously by the service data signal in the time slot without taking any measure.

Transmission of a service data signal and a pilot sequence signal overlapping with each other may make it rather difficult to detect either of the service data signal or the pilot sequence signal. In the prior art, the transmission of the service data signal and the pilot sequence signal overlapping with each other is prevented as could as possible, for example, by transmitting them in separate time slots with a guard interval in a time division system. If it is impractical to avoid transmission of the overlapping service data signal and pilot sequence signal, an approach to deal with this in the prior art is to guarantee the performance of detecting the respective pilot sequence signal and service data signal with a reasonable limitation of transmission power. In a TD-SCDMA system, for example, in order to avoid strong interference of a DwPTS signal from a remote base station with the reception of an UpPTS signal at the local base station under a particular condition, the UpPTS signal may be displaced directly into a time slot where a service data signal is arranged, and transmitted overlapping with the service data signal, and at this time the power of the service data signal in the same time slot as the UpPTS signal and hence the interfering power level of the service data signal to the UpPTS signal has to be limited in order to guarantee the performance of detecting the UpPTS signal.

The drawbacks in the prior art lie in a reduction in spectrum utilization of the system and a loss of the capacity of the system despite the additional guard interval or the limited power of the service data signal.

SUMMARY OF THE INVENTION

Embodiments of the invention provide a method, device and system for detecting a pilot sequence signal to inhibit interference of a service data signal to a pilot sequence signal to thereby improve the performance of detecting the pilot sequence signal.

An embodiment of the invention provides a method for detecting a pilot sequence signal including:
- extracting a service data signal from a received signal when the service data signal in the received signal is determined to be correct, wherein the service data signal and the pilot sequence signal in the received signal are arranged in the same time slot; and
- acquiring the pilot sequence signal from the received signal with the service data signal extracted.

An embodiment of the invention further provides a method for detecting a pilot sequence signal including:
- acquiring a second weight factor according to the power of a service data signal, of a pilot sequence signal and of a noise signal in a received signal, and weighting and extracting the service data signal from the received signal by the second weight factor, wherein the service data signal and the pilot sequence signal in the received signal are arranged in the same time slot; and
- acquiring the pilot sequence signal from the received signal with the service data signal extracted.

An embodiment of the invention further provides a communication device including:
- a communication module configured to receive or transmit a signal, wherein a service data signal and a pilot sequence signal in the received signal are arranged in the same time slot;
- a determination module configured to determine whether the service data signal is correct;
- a first processing module configured to extract the service data signal from the received signal when the determination module determines that the service data signal is correct; and
- a second processing module configured to acquire the pilot sequence signal from the received signal with the service data signal extracted.

An embodiment of the invention further provides a communication device including:

a communication module configured to receive or transmit a signal, wherein a service data signal and a pilot sequence signal in the received signal are arranged in the same time slot;

a first processing module configured to acquire a second weight factor according to the power of the service data signal, of the pilot sequence signal and of a noise signal in the received signal;

a second processing module configured to weight and extract the service data signal from the received signal by the second weight factor; and a third processing module configured to acquire the pilot sequence signal from the received signal with the service data signal extracted.

An embodiment of the invention further provides a communication system including:

a User Equipment configured to receive or transmit a signal, wherein a service data signal and a pilot sequence signal in the transmitted signal are arranged in the same time slot; and a base station configured to receive the signal transmitted from the User Equipment, to extract the service data signal from the received signal when the service data signal is determined to be correct, and to acquire the pilot sequence signal from the received signal with the service data signal extracted.

An embodiment of the invention further provides a communication system including:

a User Equipment configured to receive or transmit a signal, wherein a service data signal and a pilot sequence signal in the transmitted signal are arranged in the same time slot; and a base station configured to receive the signal transmitted from the User Equipment, to acquire a second weight factor according to the power of the service data signal, of the pilot sequence signal and of a noise signal in the received signal, to weight and extract the service data signal from the received signal by the second weight factor, and to acquire the pilot sequence signal from the received signal with the service data signal extracted.

In the embodiments of the invention, in the event that a service data signal and a pilot sequence signal in a received signal are arranged in the same time slot, when the Signal to Noise Ratio (SNR) of the service data signal is determined to be no smaller than a first threshold or when the service data signal in the received signal is determined to be correct according to the block error rate or the bit error rate of the service data signal, the service data signal may be extracted from the received signal, and the pilot sequence signal may be acquired from the received signal with the service data signal extracted; alternatively, when a second weight factor is acquired according to the power of the service data signal, of the pilot sequence signal and of a noise signal in the received signal, the service data signal can be weighted and extracted from the received signal by the second weight factor, and the pilot sequence signal can be acquired from the received signal with the service data signal extracted; so that inference of the service data signal to the pilot sequence signal can be suppressed effectively to thereby improve significantly the performance of detecting the pilot sequence signal.

DETAILED DESCRIPTION OF THE EMBODIMENTS

Figure 1:
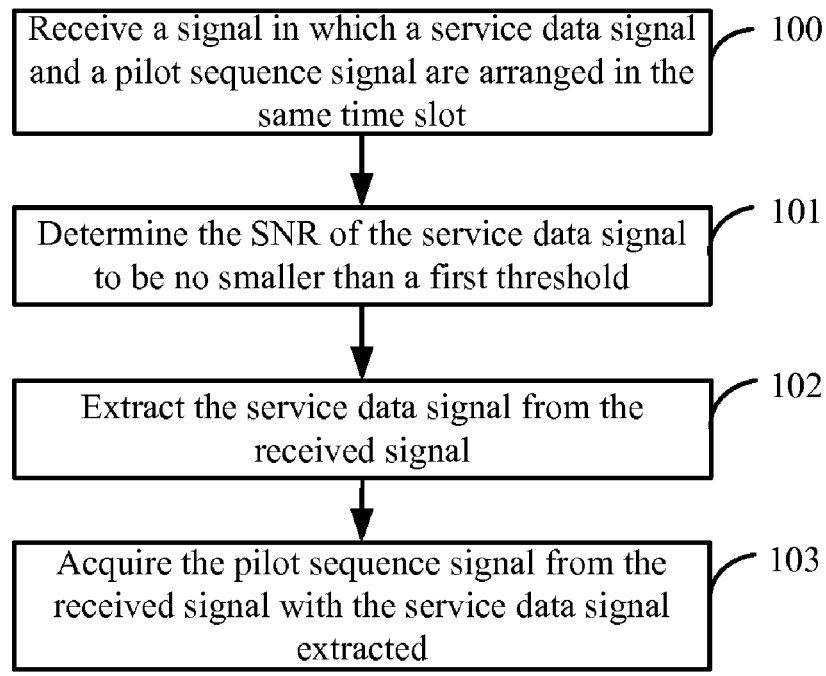
FIG. 1 is a flow chart of a process for detecting a pilot sequence signal according to a first embodiment of the invention.

In embodiments of the invention, in the event that a service data signal and a pilot sequence signal in a received signal are arranged in the same time slot, the service data signal is extracted from the received signal dependent upon the performance of detecting the service data signal, and the pilot sequence signal is acquired from the received signal with the service data signal extracted, to thereby suppress interference of the service data signal to the pilot sequence signal and improve the performance of detecting the pilot sequence signal.

A method according to an embodiment of the invention is based upon such a concept that when a service data signal is transmitted overlapping with a pilot sequence signal, interference to the pilot sequence signal is largely caused by the service data signal and interference of the service data signal to the pilot sequence signal has some characteristics distinct from those of other interference, therefore, the interference of the service data signal to the pilot sequence signal at this time can be suppressed with a reasonable interference suppression algorithm by taking advantage of such characteristics of interference of the service data signal in the same time slot to the pilot sequence signal. For example, the service data signal in the received signal can be extracted by detecting the service data signal in the received signal, and further the pilot sequence signal can be acquired from the received signal with the service data signal extracted.

Of course, the service data signal may not be detected accurately due to interference of the pilot sequence signal in the same time slot. However, the pilot sequence signal, which tends to be short in duration and typically may not be in continuous transmission, can be regarded as burst interference to the service data signal and such interference can be suppressed partially with an anti-interference capability of a receiver itself, and interference of the pilot sequence signal to the service data signal can be further suppressed with an error correction capability of channel coding and interleaving processes, therefore, the service data signal acquired in this way is relatively accurate. If information on a channel over which the service data signal travels is acquired, the service data signal can be recovered with an interference recovery method, so that interference of the service data signal can be eliminated in the received signal. This is highly feasible because channel information is readily available in numerous systems at present.

Moreover, in a specific implementation, the effect that can be achieved by the foregoing mode of eliminating interference largely depends upon the performance of detecting the service data signal. When the power of the pilot sequence signal is lower than that of the service data signal, a high performance of detecting the service data signal and thus a great effect of eliminating interference may be obtained. When the power of the pilot sequence signal is higher than that of the service data signal, the pilot sequence signal brings strong interference to the service data signal, and at this time if interference of the pilot sequence signal is not subject to any effective suppression process during detection of the service data signal, then the service data signal is detected at a serious bit error rate, so that the service data signal resulting from the interference recovery is highly correlated with the pilot sequence signal, and at this time, eliminating of interference may not offer great suppression of interference but instead even eliminate a part of the pilot sequence signal.

In view of the foregoing, when extracting the service data signal from the received signal, the performance of detecting the service data signal shall be considered. For a multiple access system, the performance of detecting service data signals of different users may vary with their transmission power, different circumstances, etc. In this case, the performance of detecting the service data signal of each of the different users can firstly be evaluated by a specific index, and if the performance of detection is good, then the service data signal of the user is extracted from a received signal, and subsequently a pilot sequence signal is acquired from the received signal with the service data signal extracted. If the performance of detection is poor, then the effect of anti-interference would not be good, and subsequent eliminating of interference dependent upon an inaccurate result of detecting the service data signal would bring about a contrary effect, thus, the service data signal of the user shall make no contribution to any interference recovery or just a reduced contribution to the signal recovered from interferences.

Numerous indexes are possible for evaluation of the performance of detecting a service data signal and primarily include anti-noise performance indexes of the service data signal, e.g., any one or combination of a Signal to Noise Ratio, a bit error rate, a block error rate, etc. Moreover, the performance of detecting a service data signal can also be evaluated by the power of the service data signal, of the pilot sequence signal, of a noise signal in the received signal. A method for processing the service data signal in the received signal according to different performance indexes of detecting the service data signal to acquire the pilot sequence signal in the received signal is explained hereinafter in respective embodiments.

The First Embodiment

The present embodiment relates to a scenario of evaluating the performance of detecting a service data signal by an SNR. In a specific implementation, the SNR of the service data signal can be compared with a first threshold, and when the SNR is determined to be no smaller than the first threshold, the service data signal may be subject to eliminating of interference, that is, the service data signal may be extracted from a received signal. Here, the first threshold may be set in view of a system performance requirement, for example, set directly as a target Signal to Noise Ratio (SNR_target) required for system power control.

In the present embodiment, a flow of a process for detecting a pilot sequence signal as illustrated in FIG. 1 includes:

Operation 100: A received signal is received from a device, where a service data signal and a pilot sequence signal in the received signal are arranged in the same time slot.

Operation 101: The SNR of the service data signal is determined to be no smaller than a first threshold.

Operation 102: The service data signal is extracted from the received signal.

Operation 103: The pilot sequence signal is acquired from the received signal with the service data signal extracted.

The received signal may be denoted by $e_{AGC}^{(ka)}$, which is a signal sequence received by the kath antenna and is a signal combining the pilot sequence signal and the service data signal.

For a multiple access system, in the operation 101, before the SNR of the service data signal is determined to be no smaller than the first threshold, it is necessary to firstly perform data detection for users involved in the received signal, where an output symbol detected for the kth user is assumed as $\hat{d}^{(k)}$, k=1, 2, ..., K, K being the number of involved users, and to further demodulate the output symbols $\hat{d}^{(k)}$, k=1, 2, ..., K detected by a receiver, and to calculate the SNRs of N data bits of the output demodulated service data signals of the respective users at the corresponding transmission location of the pilot sequence signal.

For example, if the number of users is K, then K values of SNR_gd(k), k=1, 2, ..., K may be derived. Subsequently a user k may be determined whether to contribute to eliminating of interference according to the SNR_gd(k) corresponding to the user k. In a specific implementation, a hard threshold SNR_Threshold, i.e., a first threshold, may be set, and if the SNR value of the user k satisfies SNR_gd(k)>=SNR_Threshold, then data detection for the user k is deemed reliable and will contribute to eliminating of interference. In the case of SNR_gd(k)<SNR_Threshold, data detection for the user k is deemed unreliable and will not contribute to eliminating of interference.

This is equivalent to use of a weight factor $\alpha_k$ during eliminating of interference:

$$\alpha_k = \begin{cases} 0; & \text{SNR\_gd}(k) < \text{SNR\_Threshold} \\ 1; & \text{SNR\_gd}(k) >= \text{SNR\_Threshold} \end{cases}$$

Figure 2:
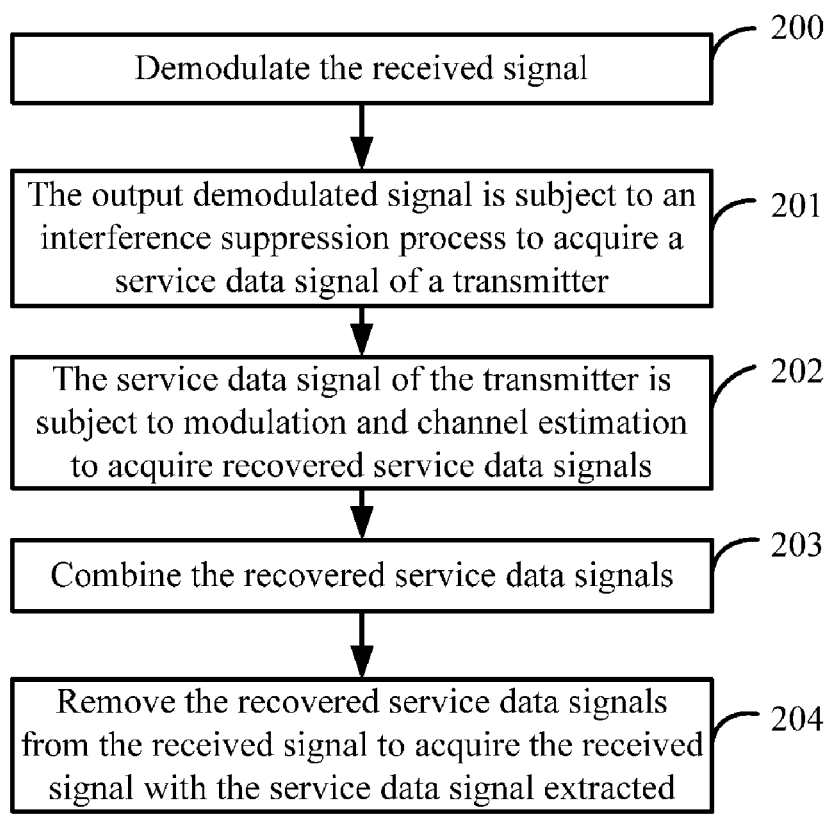
FIG. 2 is a flow chart of a process for extracting a service data signal from a received signal according to the first embodiment of the invention.

In the present embodiment, a flow of a process for extracting the service data signal from the received signal as illustrated in FIG. 2 includes:

Operation 200: The received signal is demodulated, for example, to output $\hat{d}^{(k)}$, k=1, 2, ..., K, where K is the number of involved users;

Operation 201: The output demodulated signal is subject to an interference suppression process, here possibly in various processing modes.

For example, in a first mode, the demodulated signal is subject directly to a hard decision, thereby obtaining a service data signal of a transmitter $d^{(k)}$, k=1, 2, ..., K, which can be resistant to interference and noise to a certain degree; and in a second mode, the demodulated signal is subject to channel decoding and de-interleaving and then to the same encoding and interleaving as that at the transmitter, thereby obtaining the service data signal of the transmitter $d^{(k)}$, k=1, 2, ..., K, which can be well resistant to burst interference of a pilot sequence, wherein the decoder for channel decoding has a function of error correction, thus an error correction is performed for the demodulated signal during the channel decoding and de-interleaving. The second mode is more complex to implement with a considerable processing delay than the first mode. A user may selectively use either mode of suppressing interference as desired.

Operation 202: The service data signal of the transmitter $d^{(k)}$, k=1, 2, ..., K is subject to the same modulation process as the transmitter, and the modulated signal is reconstructed with an available channel estimation result to acquire recovered service data signals.

Different simplified methods can be adopted for different systems dependent upon their system characteristics. For a TD-SCDMA system, for example, a system matrix can be constructed with an available channel estimation result and used to reconstruct the modulated signal, where modulation, spreading and scrambling processes at the transmitter and a process over a channel can be performed by multiplying the system matrix $A^{(k,ka)}$, and the data can be recovered on a code channel basis, that is, the service data signal of the transmitter may be modulated, and the modulated data signals $d^{(k)}$, k=1, 2, ..., K may be multiplied by the system matrix $\overline{A}^{(k,ka)}$ to acquire the recovered service data signals, where K denotes the total number of code channels.

Operation 203: The recovered service data signals are combined.

For example, if the signal of the kth user recovered from interferences is $$\underline{e}_{I,AGC}^{(ka,k)}, k = 1, 2, \ldots, K, \text{ then } \underline{e}_{I,AGC}^{(ka)} = \sum_{k=1}^{K} \underline{e}_{I,AGC}^{(ka,k)};$$

For a TD-SCDMA system, it follows that $$\underline{e}_{I,AGC}^{(ka)} = \sum_{k=1}^{K} A^{(k,ka)} \underline{d}^{(k)}.$$

Operation 204: The recovered service data signals are removed from the entire received signal $\underline{e}_{AGC}^{(ka)}$ to acquire the received signal from which the service data signals have been extracted:

$$\underline{e}_{u,AGC}^{(ka)} = \underline{e}_{AGC}^{(ka)} - \underline{e}_{I,AGC}^{(ka)}.$$

In a specific implementation, a weight factor may be set for combining the recovered service data signals, and the recovered service data signals may be weighted and combined by the weight factor.

If the signal of the kth user recovered from interferences is $\underline{e}_{I,AGC}^{(ka,k)}$, k=1, 2, ..., K, then $$\underline{e}_{I,AGC}^{(ka)} = \sum_{k=1}^{K} \alpha_k \underline{e}_{I,AGC}^{(ka,k)};$$

This procedure may adopt different simplified methods for different systems dependent upon characteristics of the systems. For a TD-SCDMA system, for example:

$$\underline{e}_{d,AGC}^{(ka)} = \sum_{k=1}^{K_{vru}} \alpha_k A^{(k,ka)} \underline{d}^{(k)} = \sum_{k=1}^{K_{vru}} A^{(k,ka)} \alpha_k \underline{d}^{(k)}.$$

Here, the code channel needed to be recovered from interferences ($\alpha_k \neq 0$) may firstly be recovered from interferences and then be weighted, or the modulated data symbol $d^{(k_{vru})}$ may firstly be weighted and then be recovered from interferences. Comparatively, the calculation effort of the latter is less than that of the former.

At this time the following mode for eliminating of interference can be adopted to remove the service data signal from the received signal:

$$\underline{e}_{u,AGC}^{(ka)} = \underline{e}_{AGC}^{(ka)} - \alpha \underline{e}_{I,AGC}^{(ka)}.$$

The value of the weight factor $\alpha$ depends upon the current performance of data demodulation, and the weight factor can be set differently. When the SNR of the service data signal is no smaller than the first threshold, the weight factor may equal to 1, and at this time the service data signal can be removed directly from the received signal.

Preferably, when the SNR of the service data signal is smaller than the first threshold and larger than a second threshold, a first weight factor can be derived from the SNR, the first threshold and the second threshold, and the recovered service data signals can be weighted and combined by the first weight factor. Here, the second threshold reflects the unreliability of a demodulated signal and typically has a low value, which can be set dependent upon a system performance requirement or set by a user through simulation.

In a specific implementation, two thresholds can be set dependent upon the SNR value of a code channel: an upper threshold SNR_Threshold_High (i.e., the first threshold) and a lower threshold SNR_Threshold_Low (i.e., the second threshold), where SNR_Threshold_High>SNR_Threshold_Low.

If the SNR value of a user k satisfies SNR_gd(k)>=SNR_Threshold_High, then data detection for the user k can be deemed reliable and will contribute to eliminating of interference. In the case of SNR_gd(k)<=SNR_Threshold_Low, data detection for the user k can be deemed unreliable and will not contribute to eliminating of interference. When SNR_Threshold_High>SNR_gd(k)>SNR_Threshold_Low, part of data detection for the user k can be deemed reliable, and at this time the first weight factor can be calculated from SNR_gd(k), SNR_Threshold_High and SNR_Threshold_Low, and eliminating of interference can be performed with this weight factor.

The first weight factor can be calculated differently, for example, in a linear weight method:

$$\alpha_k = \frac{\text{SNR\_gd}(k) - \text{SNR\_Threshold\_Low}}{\text{SNR\_Threshold\_High} - \text{SNR\_Threshold\_Low}}$$

This is equivalent to the use of a weight factor during eliminating of interference:

$$\alpha_k = \begin{cases} 0; & \text{SNR\_gd}(k) = < \text{SNR\_Threshold} \\ \frac{\text{SNR\_gd}(k) - \text{SNR\_Threshold\_Low}}{\text{SNR\_Threshold\_High} - \text{SNR\_Threshold\_Low}}; & \text{SNR\_Threshold\_High} > \text{SNR\_gd}(k) > \text{SNR\_Threshold\_Low} \\ 1; & \text{SNR\_gd}(k) >= \text{SNR\_Threshold} \end{cases}$$

To acquire the pilot sequence signal from the received signal with the service data signal extracted, the received signal with the service data signal extracted may be detected, and the pilot sequence signal can be acquired dependent upon the detection result. The detection method here may be the same as any existing method or otherwise.

Figure 3:
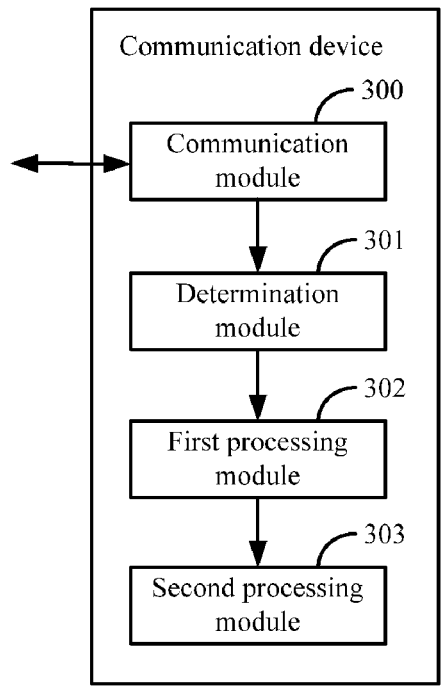
FIG. 3 is a schematic diagram of a structure of a communication device according to the first embodiment of the invention.

Based upon the same inventive concept, the present embodiment further provides a communication device, which may be a base station or another device configured to detect a pilot sequence signal. The communication device can be structured as illustrated in FIG. 3 including a communication module 300, a determination module 301, a first processing module 302 and a second processing module 303. The communication module 300 is configured to receive or transmit a signal, where a service data signal and a pilot sequence signal in the received signal are arranged in the same time slot; the determination module 301 is configured to determine whether the SNR of the service data signal is no smaller than a first threshold; the first processing module 302 is configured to extract the service data signal from the received signal when the determination module 301 determines the SNR of the service data signal to be no smaller than the first threshold; and the second processing module 303 is configured to acquire the pilot sequence signal from the received signal with the service data signal extracted.

Figure 4:
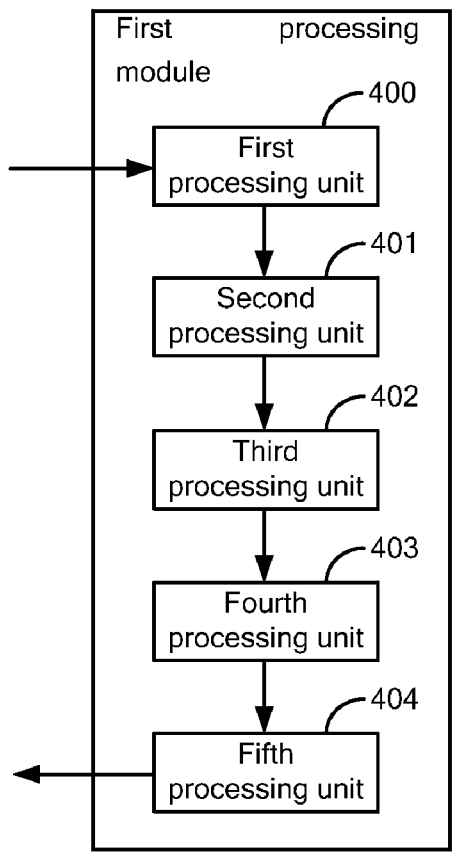
FIG. 4 is a schematic diagram of a structure of a first processing module according to the first embodiment of the invention.

The first processing module 302 in the embodiment of the invention structured as illustrated in FIG.4 particularly includes a first processing unit 400, a second processing unit 401, a third processing unit 402, a fourth processing unit 403 and a fifth processing unit 404. The first processing unit 400 is configured to demodulate the received signal; the second processing unit 401 is configured to subject directly the demodulated signal to a hard decision for output as a service data signal of a transmitter, or subject the demodulated signal to channel decoding and de-interleaving and then to the same encoding and interleaving as the transmitter for output as the service data signal of the transmitter, wherein an error correction is performed for the demodulated signal during the channel decoding and de-interleaving; the third processing unit 402 is configured to subject the service data signal of the transmitter to the same modulation process as the transmitter and to reconstruct the modulated signal according to an available channel estimation result to acquire recovered service data signals; the fourth processing unit 403 is configured to combine the recovered service data signals; and the fifth processing unit 404 is configured to remove the combined service data signal from the received signal to acquire the received signal with the service data signal extracted.

Particularly, after the determination module 301 determines the SNR of the service data signal to be smaller than the first threshold and larger than a second threshold, the fourth processing unit 403 may derive a first weight factor from the SNR, the first threshold and the second threshold and weight and combine the recovered service data signals by the first weight factor.

Figure 5:
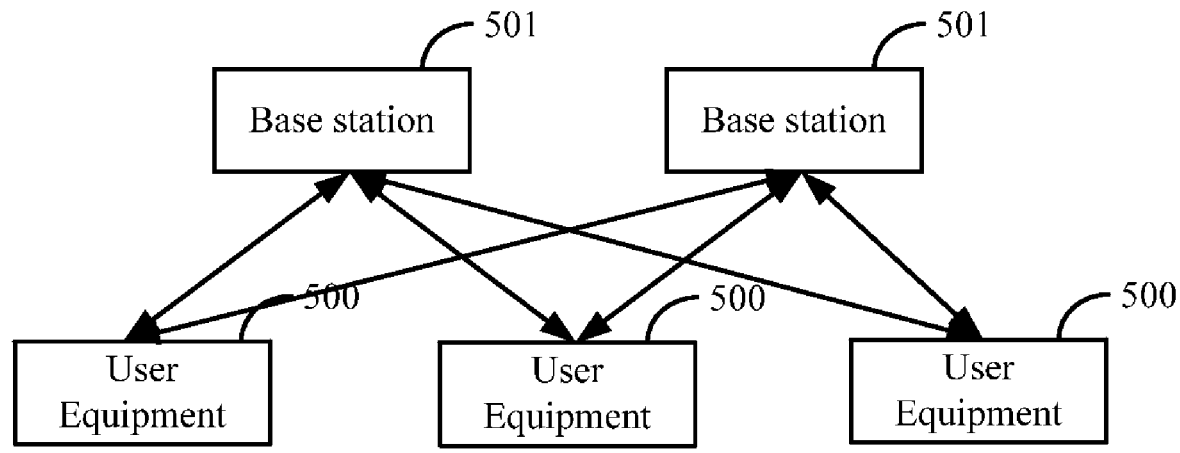
FIG. 5 is a schematic diagram of a structure of a communication system according to the first embodiment of the invention.

Based upon the same inventive concept, an embodiment of the invention further provides a communication system structured as illustrated in FIG. 5, which includes a User Equipment 500 and a base station 501, The User Equipment 500 is configured to receive or transmit a signal, where a service data signal and a pilot sequence signal in the transmitted signal are arranged in the same time slot; and the base station 501 is configured to receive the signal transmitted from the User Equipment 500 and to extract the service data signal from the received signal and acquire the pilot sequence signal from the received signal with the service data signal extracted upon determining the SNR of the service data signal to be no smaller than a first threshold.

The Second Embodiment

The second embodiment relates to a scenario of evaluating the performance of detecting a service data signal by a bit error rate or a block error rate. In a specific implementation, correctness of the service data signal can be determined by a bit error rate or a block error rate, and the service data signal can be subject to eliminating of interference, that is, the service data signal can be extracted from a received signal, upon determining the service data signal to be correct.

Figure 6:
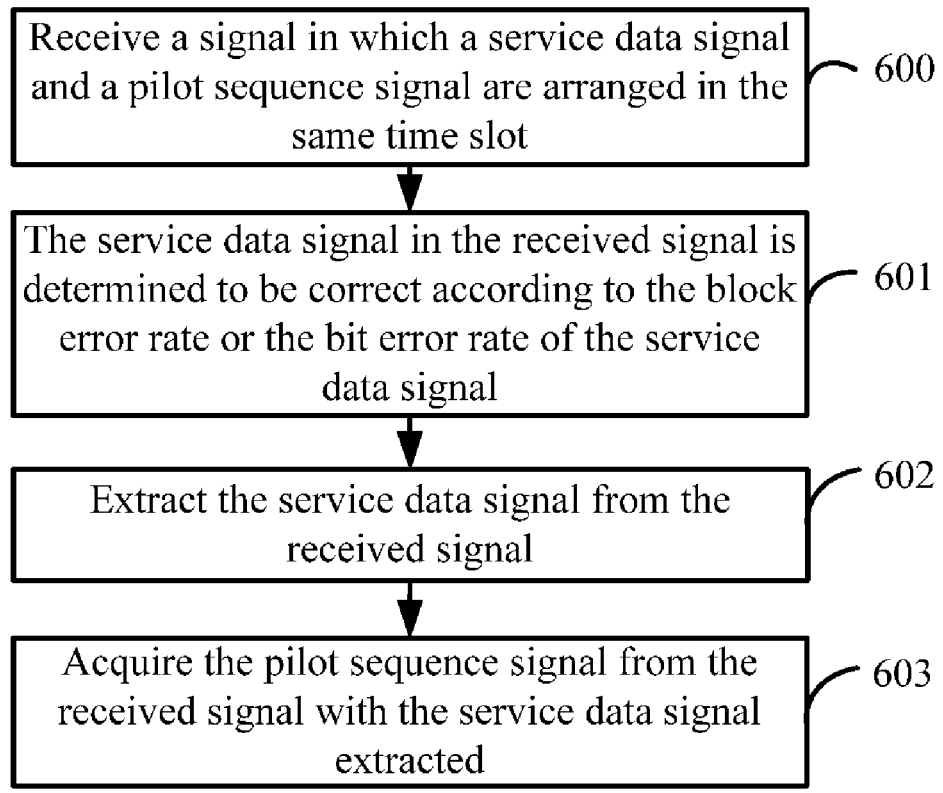
FIG. 6 is a flow chart of a process for detecting a pilot sequence signal according to a second embodiment of the invention.

In the present embodiment, a flow of a process for detecting a pilot sequence signal as illustrated in FIG. 6 includes:

Operation 600: A received signal is received from another device, where a service data signal and a pilot sequence signal in the received signal are arranged in the same time slot.

Operation 601: The service data signal is determined to be correct according to the bit error rate or the block error rate of the service data signal in the received signal.

Operation 602: The service data signal is extracted from the received signal.

Operation 603: The pilot sequence signal is acquired from the received signal with the service data signal extracted.

Assume the received signal is $e_{AGC}^{(ka)}$, which denotes a signal sequence received by the kath antenna and is a signal combining the pilot sequence signal and the service data signal.

For a multiple access system, in the operation 601, before the service data signal is determined to be correct according to the bit error rate or the block error rate of the service data signal in the received signal, it is necessary to perform data detection for users involved in the received signal and to derive the bit error rate or the block error rate dependent upon the detection result. For example, assume an output symbol detected for the kth user is $\hat{d}^{(k)}$, k=1, 2, ..., K, where K is the number of involved users, and the output symbols $\hat{d}^{(k)}$, k=1, 2, ... K detected by a receiver are demodulated, and after the output demodulated data is subject to operations of channel decoding, de-interleaving, etc., the block error rate is calculated with a Cyclic Redundancy Check (CRC) to thereby determine whether the service data signal is correct, and the service data signal is subject to eliminating of interference if the service data signal is correct. This similarly applies to calculation of the bit error rate.

A flow of a process for extracting the service data signal from the received signal in the present embodiment is similar to that in the first embodiment (see FIG. 2), and detailed descriptions thereof is omitted herein. However, since the performance of detecting the service data signal is evaluated by a block error rate or a bit error rate in the present embodiment, if the service data signal is determined correct, the service data signal can be extracted directly from the received signal without weighting and combining thereof for the service data signal to be extracted.

Also, to acquire the pilot sequence signal from the received signal with the service data signal extracted, the received signal with the service data signal extracted may be detected, and the pilot sequence signal may be acquired dependent upon the detection result. The detection method here may be the same as any existing method or otherwise.

Based upon the same inventive concept, the present embodiment further provides a communication device, which may be a base station or another device configured to detect a pilot sequence signal. The communication device can be structured as illustrated in FIG. 3 in the first embodiment also including a communication module 300, a determination module 301, a first processing module 302 and a second processing module 303, but in the present embodiment, the determination module 301 is configured to determine whether the service data signal is correct according to the block error rate or the bit error rate of the service data signal; and the first processing module 302 is configured to extract the service data signal from the received signal when the determination module 301 determines the service data signal to be correct. In the present embodiment, the communication module 300 and the second processing module 303 function like in the first embodiment.

Moreover, the structure of the first processing module 302 in the present embodiment is the same as that of the first processing module 302 in the first embodiment (see FIG. 4) and also includes a first processing unit 400, a second processing unit 401, a third processing unit 402, a fourth processing unit 403 and a fifth processing unit 404, where the respective units function like in the first embodiment, and detailed descriptions thereof is omitted herein. However, the fourth processing unit 403 involves no weighting and combining for the service data signal to be extracted.

Based upon the same inventive concept, an embodiment of the invention further provides a communication system, the structure of which is the same as that of the communication system in the first embodiment (see FIG. 5), but in the present embodiment, the base station 501 is configured to receive the signal transmitted from the User Equipment 500 and to extract the service data signal from the received signal and acquire the pilot sequence signal from the received signal with the service data signal extracted upon determining the service data signal to be correct according to the block error rate or the bit error rate of the service data signal in the received signal.

The Third Embodiment

The third embodiment relates to a scenario of evaluating the performance of detecting a service data signal by the power of the service data signal, of a pilot sequence signal and of a noise signal. In a specific implementation, a second weight factor can be derived from the power of the service data signal, of the pilot sequence signal and of the noise signal, and the service data signal in a received signal can be extracted with the second weight factor.

Figure 7:
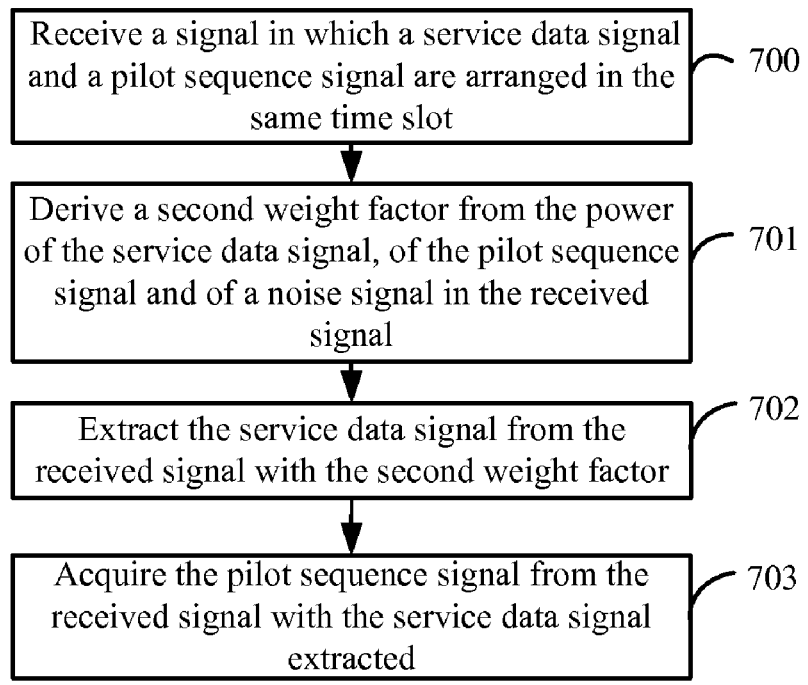
FIG. 7 is a flow chart of a process for detecting a pilot sequence signal according to a third embodiment of the invention.

In the present embodiment, a flow of a process for detecting a pilot sequence signal as illustrated in FIG. 7 includes:

Operation 700: A received signal is received from another device, where a service data signal and a pilot sequence signal in the received signal are arranged in the same time slot.

Operation 701: A second weight factor is derived from the power of the service data signal, of the pilot sequence signal and of a noise signal in the received signal.

Operation 702: The service data signal is weighted and extracted from the received signal by the second weight factor.

Operation 703: The pilot sequence signal is acquired from the received signal with the service data signal extracted.

Assume the received signal is $e_{AGC}^{(ka)}$, which denotes a signal sequence received by the kath antenna and is a signal combining the pilot sequence signal and the service data signal.

A flow of a process for extracting the service data signal from the received signal in the present embodiment is similar to that in the first embodiment (see FIG. 2), and detailed descriptions thereof is omitted herein. However since the performance of detecting the service data signal is evaluated by the power of the service data signal, of the pilot sequence signal and of the noise signal in the present embodiment, it is required to derive the second weight factor from the power of the service data signal, of the pilot sequence signal and of the noise signal, and the service data signal in the received signal can be extracted with the second weight factor, that is, the recovered service data signals can be weighted and combined by the second weight factor.

In a specific implementation, assume the power of the service data signal, of the pilot sequence signal and of the noise signal is $P_n$, $P_u$, $P_d$, respectively, then it follows that the second weight factor is:

$$\alpha = f(P_n, P_u, P_d)$$

Here, the power of the service data signal, of the pilot sequence signal and of the noise signal can be derived differently. For example, since the pilot sequence signal tends to be short in duration, the power of the service data signal can be derived from direct averaging of the power of the received signal at locations where no pilot sequence signal is present or from channel estimation. The power of the noise signal can be calculated with a system measurement algorithm, and the power of the pilot sequence signal can be derived from the former two and the power of a signal at a location where the pilot sequence signal is transmitted.

The function $f$ here can be embodied differently, for example, as in the following formula 1:

$$\alpha = f(P_n, P_u, P_d) = \frac{1}{1 + \frac{P_u + P_n}{P_d} * \frac{eScalar}{Ka\_num}};$$

Or as in the following formula 2:

$$\alpha = f(P_n, P_u, P_d) = \begin{cases} 0; & \frac{P_u + P_n}{P_d} \geq threshold \\ 1; & \frac{P_u + P_n}{P_d} < threshold; \end{cases}$$

Here, eScalar is a modification factor, Ka_num is the number of antennas, and threshold is a threshold. The formula 1 can be regarded as a mode based on a soft threshold, and the formula 2 can be regarded as a mode based on a hard threshold. As can be apparent from the formula 1, when both the power of the pilot sequence signal and that of the noise signal is low, then $\alpha \rightarrow 1$ and the service data signal can be extracted directly from the received signal; and when the power of the pilot sequence signal is much higher than that of the service data signal, then $\alpha \rightarrow 0$, and this can be regarded as skipping eliminating of interference and equivalent to direct detection of the received signal to acquire the pilot sequence signal.

Similarly to the first embodiment, to remove the service data signal from the received signal, the eliminating of interference may be adopted using the following equation:

$$e_{u\_AGC}^{(ka)} = e_{AGC}^{(ka)} - \alpha e_{I\_AGC}^{(ka)}.$$

Also, to acquire the pilot sequence signal from the received signal with the service data signal extracted, the received signal with the service data signal extracted may be detected, and the pilot sequence signal may be acquired dependent upon the detection result. The detection method here may be the same as any existing method or otherwise.

Figure 8:
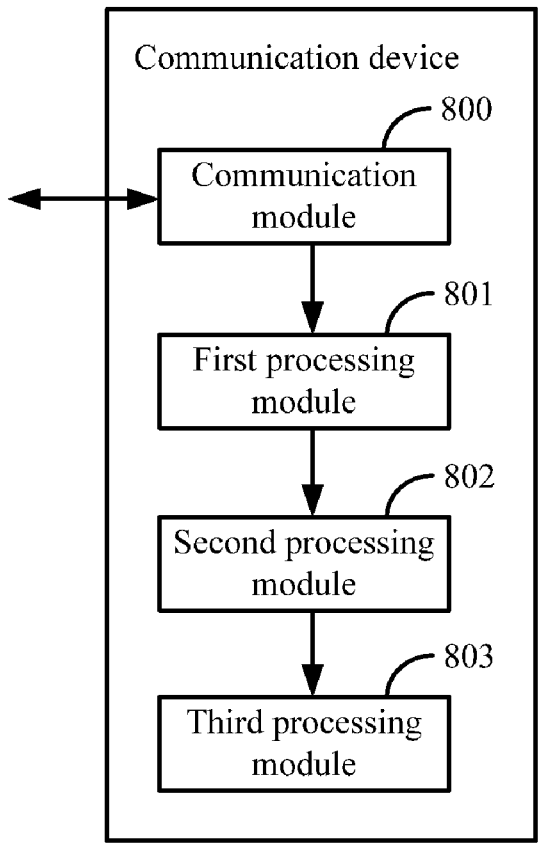
FIG. 8 is a schematic diagram of a structure of a communication device according to the third embodiment of the invention.

Based upon the same inventive concept, the present embodiment further provides a communication device, which may be a base station or another device configured to detect a pilot sequence signal. The communication device can be structured as illustrated in FIG. 8 including a communication module 800, a first processing module 801, a second processing module 802 and a third processing module 803. The communication module 800 is configured to receive or transmit a signal, where a service data signal and a pilot sequence signal in the received signal are arranged in the same time slot; the first processing module 801 is configured to derive a second weight factor from the power of the service data signal, of the pilot sequence signal and of a noise signal in the received signal; the second processing module 802 is configured to weight and extract the service data signal from the received signal by the second weight factor; and the third processing module 803 is configured to weight and extract the pilot sequence signal from the received signal with the service data signal extracted.

The structure of the second processing module 802 in the present embodiment is the same as that of the first processing module 302 in the first embodiment (see FIG. 4) and also includes a first processing unit 400, a second processing unit 401, a third processing unit 402, a fourth processing unit 403 and a fifth processing unit 404, but in the present embodiment, the fourth processing unit 403 is configured to weight and combine the recovered service data signals by the second weight factor.

Based upon the same inventive concept, an embodiment of the invention further provides a communication system, the structure of which is the same as that of the communication system in the first embodiment (see FIG. 5), but in the present embodiment, the base station 501 is configured to receive the signal transmitted from the User Equipment 500, to derive a second weight factor from the power of the service data signal, of the pilot sequence signal and of a noise signal in the received signal, to weight and extract the service data signal from the received signal by the second weight factor, and to acquire the pilot sequence signal from the received signal with the service data signal extracted.

In the embodiments of the invention, in the event that a service data signal and a pilot sequence signal in a received signal are arranged in the same time slot, when the SNR of the service data signal is determined to be no smaller than a first threshold or when the service data signal in the received signal is determined to be correct according to the block error rate or the bit error rate of the service data signal, the service data signal can be extracted from the received signal, and the pilot sequence signal can be acquired form the received signal with the service data signal extracted; or when a second weight factor is derived from the power of the service data signal, of the pilot sequence signal and of a noise signal in the received signal, the service data signal can be weighted and extracted from the received signal by the second weight factor, and the pilot sequence signal can be acquired form the received signal with the service data signal extracted, so that inference of the service data signal to the pilot sequence signal can be suppressed effectively to thereby improve significantly the performance of detecting the pilot sequence signal and achieve higher spectrum utilization of and capacity of the system as compared with those methods in the prior art.

Evidently, those skilled in the art can make various modifications and variations to the invention without departing from the scope of the invention. Accordingly, the invention is also intended to encompass these modifications and variations to the invention provided that they come into the scope of the claims appended to the invention and their equivalences.

The invention claimed is:

1. A method for detecting a pilot sequence signal comprising:

extracting a service data signal from a received signal when the service data signal in the received signal is determined to be correct, wherein the service data signal and the pilot sequence signal in the received signal are arranged in the same time slot; and acquiring the pilot sequence signal from the received signal with the service data signal extracted;

wherein extracting the service data signal from the received signal comprises:

demodulating the received signal;

subjecting the demodulated signal to a hard decision for output as a service data signal of a transmitter; or subjecting the demodulated signal to channel decoding and de-interleaving and then to the same encoding and interleaving as that at the transmitter for output as the service data signal of the transmitter, wherein an error correction is performed for the demodulated signal during the channel decoding and de-interleaving;

subjecting the service data signal of the transmitter to the same modulation process as that at the transmitter, and reconstructing the modulated signal based on an available channel estimation result to acquire recovered service data signals;

combining the recovered service data signals; and removing the combined service data signals from the received signal to acquire the received signal with the service data signal extracted.

2. The method of claim 1, wherein the service data signal in the received signal is determined to be correct when a signal to noise ratio of the service data signal in the received signal is no smaller than a first threshold; or the service data signal in the received signal is determined to be correct according to a block error rate or a bit error rate of the service data signal in the received signal.

3. The method of claim 1, wherein a system matrix is constructed with the available channel estimation result and used to reconstruct the modulated signal.

4. The method of claim 1, wherein when the signal to noise ratio of the service data signal is smaller than a first threshold and larger than a second threshold, a first weight factor is derived from the signal to noise ratio, the first threshold and the second threshold, and the recovered service data signals are weighted and combined by the first weight factor.

5. The method of claim 1, wherein acquiring the pilot sequence signal from the received signal with the service data signal extracted comprises:

detecting the received signal with the service data signal extracted, and acquiring the pilot sequence signal dependent upon the detection result.

6. A method for detecting a pilot sequence signal, comprising:

deriving a weight factor from the power of a service data signal, of a pilot sequence signal and of a noise signal in a received signal, and weighting and extracting the service data signal from the received signal by the weight factor, wherein the service data signal and the pilot sequence signal in the received signal are arranged in the same time slot; and acquiring the pilot sequence signal from the received signal with the service data signal extracted.

7. The method of claim 6, wherein extracting the service data signal from the received signal comprises:

demodulating the received signal;

subjecting the demodulated signal to a hard decision for output as a service data signal of a transmitter; or subjecting the demodulated signal to channel decoding and de-interleaving and then to the same encoding and interleaving as that at the transmitter for output as the service data signal of the transmitter, wherein an error correction is performed for the demodulated signal during the channel decoding and de-interleaving;

subjecting the service data signal of the transmitter to the same modulation process as that at the transmitter, and reconstructing the modulated signal based on an available channel estimation result to acquire recovered service data signals;

weighting and combining the recovered service data signals by the weight factor; and removing the combined service data signals from the received signal to acquire the received signal with the service data signal extracted.

8. The method of claim 7, wherein a system matrix is constructed with the available channel estimation result and used to reconstruct the modulated signal.

9. The method of claim 6, wherein acquiring the pilot sequence signal from the received signal with the service data signal extracted comprises:

detecting the received signal with the service data signal extracted, and acquiring the pilot sequence signal dependent upon the detection result.

10. A communication device, comprising:

a communication module configured to receive a signal, wherein a service data signal and a pilot sequence signal in the received signal are arranged in the same time slot;

a determination module configured to determine whether the service data signal is correct;

a first processing module configured to extract the service data signal from the received signal when the service data signal is determined to be correct by the determination module; and a second processing module configured to acquire the pilot sequence signal from the received signal with the service data signal extracted;

wherein the first processing module comprises:

a first processing unit configured to demodulate the received signal;

a second processing unit configured to subject the demodulated signal to a hard decision for output as a service data signal of a transmitter; or subject the demodulated signal to channel decoding and de-interleaving and then to the same encoding and interleaving as that at the transmitter for output as the service data signal of the transmitter, wherein an error correction is performed for the demodulated signal during the channel decoding and de-interleaving;

a third processing unit configured to subject the service data signal of the transmitter to the same modulation process as that at the transmitter, and to reconstruct the modulated signal based on an available channel estimation result to acquire recovered service data signals;

a fourth processing unit configured to combine the recovered service data signals; and a fifth processing unit configured to remove the combined service data signals from the received signal to acquire the received signal with the service data signal extracted.

11. The device of claim 10, wherein the determination module is further configured to determine the service data signal in the received signal to be correct when a signal to noise ratio of the service data signal in the received signal is no smaller than a first threshold; or to determine the service data signal in the received signal to be correct according to a block error rate or a bit error rate of the service data signal in the received signal.

12. The device of claim 10, wherein when the determination module determines the signal to noise ratio of the service data signal to be smaller than a first threshold and larger than a second threshold, the fourth processing unit is configured to derive a first weight factor from the signal to noise ratio, the first threshold and the second threshold, and to weight and combine the recovered service data signals by the first weight factor.

* * * * *